United States Patent [19]

Miyoshi et al.

[11] Patent Number: 5,029,113

[45] Date of Patent: Jul. 2, 1991

[54] DATA PROCESSING SYSTEM HAVING HELP-IMAGE REVISION MEANS

[75] Inventors: Akito Miyoshi; Hiromitsu Terai, both of Saitama, Japan

[73] Assignee: Honda Giken Kogyo Kabushiki Kaisha, Tokyo, Japan

[21] Appl. No.: 365,161

[22] PCT Filed: Aug. 22, 1988

[86] PCT No.: PCT/JP88/00831

§ 371 Date: Feb. 13, 1989

§ 102(e) Date: Feb. 13, 1989

[87] PCT Pub. No.: WO89/02114

PCT Pub. Date: Mar. 9, 1989

[30] Foreign Application Priority Data

Aug. 24, 1987 [JP] Japan .................................. 62-209775

[51] Int. Cl.⁵ .................................................. G06F 3/14
[52] U.S. Cl. ....................................... 364/521; 364/518
[58] Field of Search ...................... 364/518, 521, 523; 340/721, 723; 273/1 E

[56] References Cited

U.S. PATENT DOCUMENTS

| 4,500,964 | 2/1985 | Nickle | 364/300 |
| 4,789,962 | 12/1988 | Berry et al. | 364/900 |
| 4,964,077 | 10/1990 | Eisen et al. | 364/900 |

OTHER PUBLICATIONS

*Microsoft Works Reference*, 1987, pp. 4–9 and 30–41.

Primary Examiner—Heather R. Herndon
Attorney, Agent, or Firm—Pollock, VandeSande and Priddy

[57] ABSTRACT

In a data processing system, data processing is carried out in accordance with data fed in from an input, the results of the data processing are displayed on a display, and the data processing being carried out is interrupted when it is necessary to display a help image. A help image memory and an associated help image revising facility are provided to store help image data which can be freely revised (added, corrected and/or deleted). An operator can revise the stored help image data and read necessary help images out of the memory to the display at any time.

5 Claims, 2 Drawing Sheets

DATA PROCESSING SYSTEM HAVING HELP-IMAGE REVISION MEANS

BACKGROUND OF THE INVENTION

1. Field of the Invention

This invention relates to a data processing system, and more particularly to a data processing system which is adapted to permit performance of at least one of the functions of addition, correction, and deletion (hereinafter referred to as "alteration") on a message displayed on a help image display.

2. Description of the Prior Art

Generally, some if not all of versions of a data processing system using a computer as a core thereof, specifically so-called personal computers and office computers, are provided with a help function which is aimed at aiding in the operator's manipulation.

The term "help function" refers to a data processor capability that enables the operator of a given system, whenever need arises, to have information necessary for the operation of the system such as, for example, a message on how to use a keyboard or how to use a peripheral device displayed on an image display. From the message thus displayed, the operator learns how to use the keyboard, for example. Generally, the operator attains this help function by depressing a help key on the keyboard thereby effecting an interruption in the CPU operation and causing the message stored in advance in the program of the system to be displayed visibly.

Heretofore, the message desired to be visibly displayed by the depression of the help key has been set during the designing of the system and stored on the program.

The prior art described above has entailed the following disadvantage.

Since the choice of contents of the message to be displayed is left to the discretion of the designer of the system, the contents of the message do not always reflect the needs of the operator actually using the system. Frequently, the operator finds the contents of the message unsatisfactory because of the paradox that an unnecessary message is present but the message necessary for him is absent, for example.

Since the message is stored on the program, any attempt at making an addition, correction, or deletion with respect to the contents of the message necessitates an extremely difficult operation.

This invention has been produced for the solution of the disadvantage of the prior art described above. It is an object of this invention to provide a data processing system which is adapted to facilitate alteration of the message to be displayed on the help image display and consequently permit highly efficient performance of data processing without reference to the ability and experience on the part of the operator.

DESCRIPTION OF THE PREFERRED EMBODIMENTS

Figure 1:
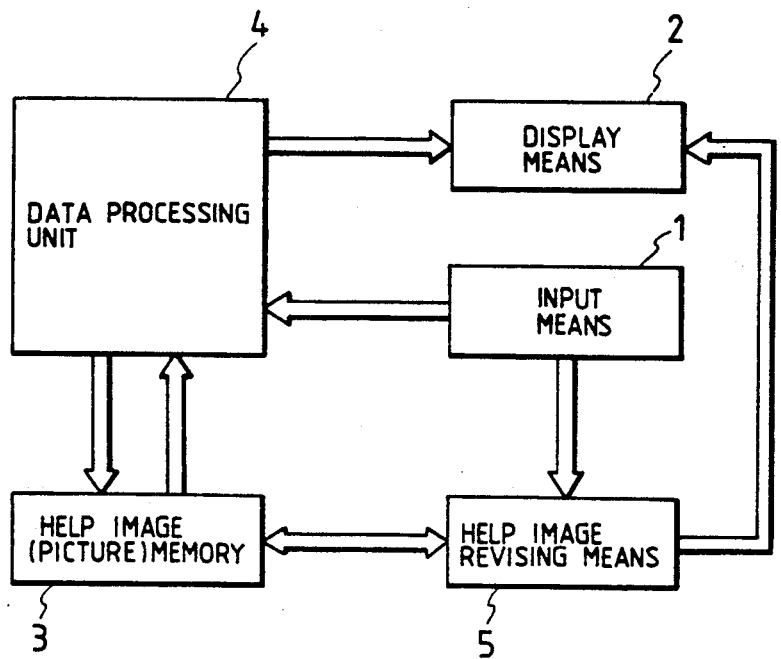
FIG. 1 is a block diagram illustrating the general construction of this invention.

FIG. 1 is a block diagram illustrating the construction of this invention. With reference to FIG. 1, data processing means 4 carries out data processing in accordance with data to be fed in from input means 1, displays the contents of the data processing on display means 2, selectively effects an interruption in the data processing carried out in accordance with the aforementioned data, and causes a help image stored in help image memory means 3 to be displayed on the display means 2. Help image revising means 5 alters the help image stored in the help image memory means 3 and causes the resultant revised help image to be stored in the help image memory means 3.

The contents of the help image consist of message data to be displayed and color data to be used in designating message data or only the message data to be displayed.

The help image revising means 5 is also capable of calling out the help image in accordance with the data to be fed in from the input means 1.

With reference to FIG. 1, the data processing means 4 carries out data processing in accordance with the data fed in by the operator through the medium of the input means 1. When the operator manipulates the system at this point so as to induce issuance of an interruption signal from the input means 1 to the data processing means 4, the data processing means 4, on receiving the interruption signal, proceeds to receive the message to be displayed, or the message data, and the color data and feeds the data to the display means 2.

When the operator manipulates the system for issuance of stated data from the input means 1 to the help image revising means 5 while the data processing means 4 is not engaged in data processing, the help image revising means 5 receives message data corresponding to the received data or the message data and the color data from the help image memory means 3. On receiving the message data or the message data and the color data, the help image revising means 5 feeds the data to the display means 2. When the operator at this point manipulates the input means 1 so as to effect a revision or an alteration in the message data and/or the color data manifested on the display means 2, the help image revising means causes the resultant revised message data to be stored as new help image data in the help image memory means 3.

Figure 2:
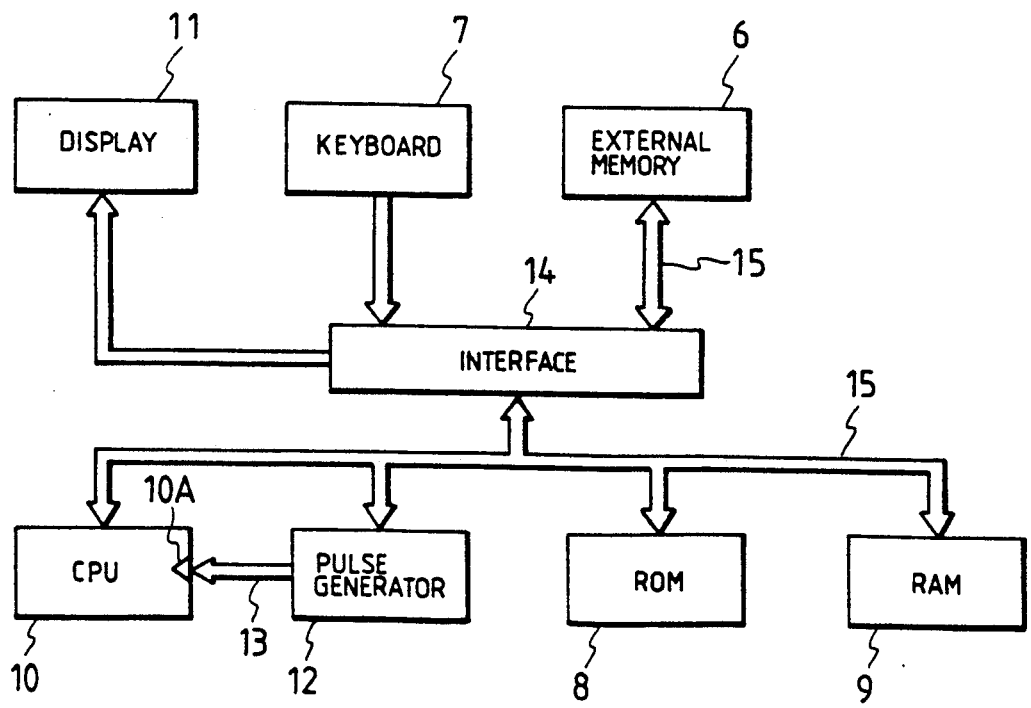
FIG. 2 is a block diagram illustrating an embodiment of this invention.

FIG. 2 is a block diagram illustrating the construction of an embodiment of this invention. With reference to FIG. 2, an external memory means 6 is provided for storing therein data to be displayed as the help image, 7 is a keyboard, 8 is a ROM storing a program for executing a processing to be described fully later on with reference to FIG. 3, 9 is a RAM for temporary storage of message data stored in the external memory means 6, 10 is a CPU, 11 is a display, 12 is a pulse generator for issuing a signal 13 demanding an interruption to an interruption terminal 10A of the CPU 11 in response to the depression of a help key (not shown) on the keyboard 7, 14 is an interface serving to connect the keyboard 7 and the display 11 to the CPU 10, the ROM 8, the RAM 9, and the pulse generator 12, and 15 is a common bus.

The external memory means 6 stores data representing the contents of a message and the color data for designating the color in which the message is to be manifested on the display 11.

The message data and the color data stored in the external memory means 6 are fed out to be manifested visibly on the display 11 by the injection of an image code through the keyboard 7.

Figure 3:
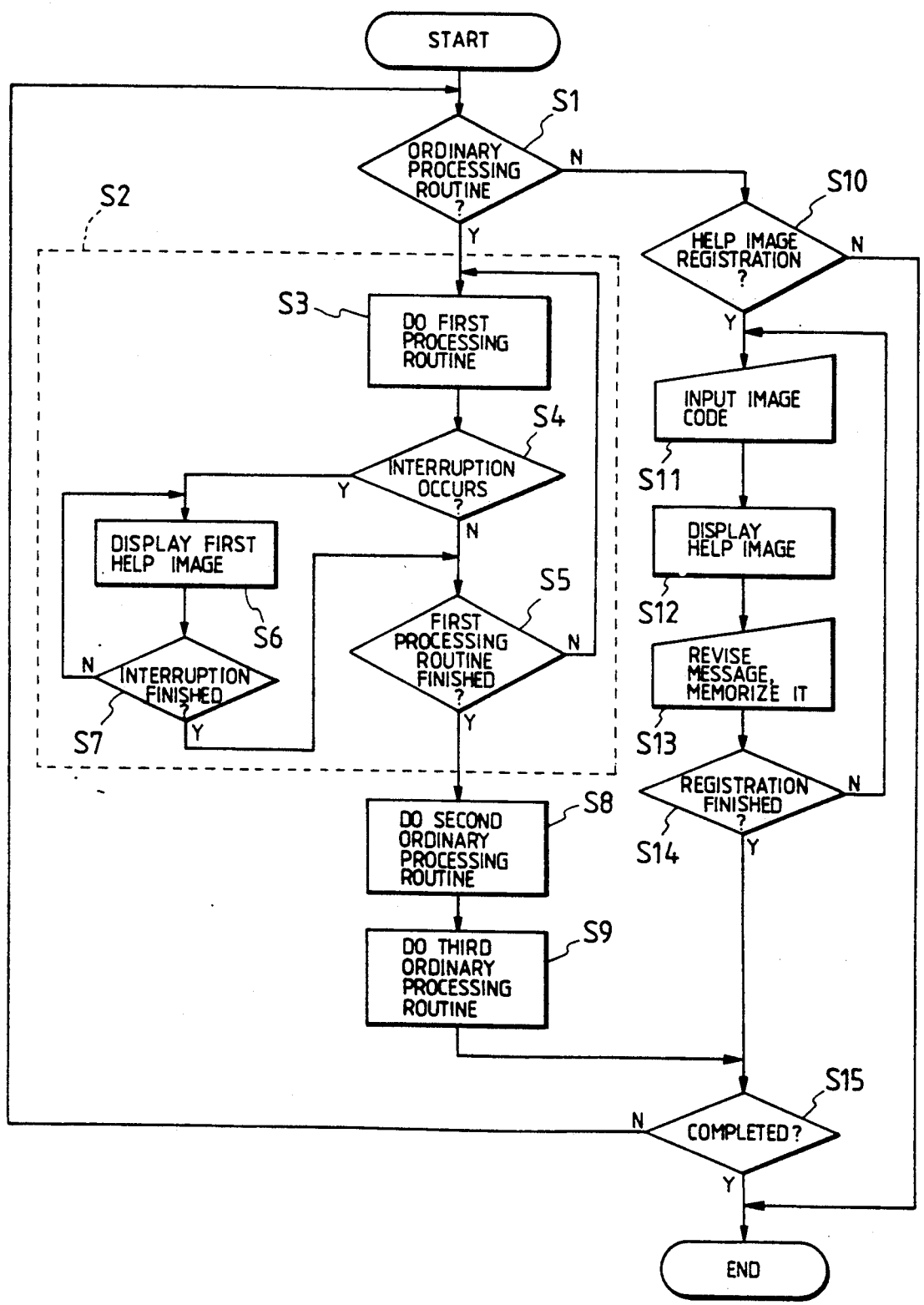
FIG. 3 is a flow chart illustrating the operation of the embodiment of this invention.

FIG. 3 is a flow chart illustrating one embodiment of the present invention.

With reference to FIG. 3, when a program is started, selection is effected between the ordinary processing routine and the help image registering routine at a step S1. The term "ordinary processing routine" as used herein means a main routine for performing data processing and the term "help image registering routine" means a routine for effecting at least one of the functions of addition, correction, and deletion, namely an alteration, with respect to the message displayed on the display means.

When the ordinary processing routine is selected here, the program is executed through a first processing routine at the step S2 and then through a second processing routine at a step S8. For a first processing routine at a step S2, the second processing routine at the step S8, and a third processing routine at a step S9, operating images necessary for the execution of a relevant data processing (hereinafter referred to as "operating image") are severally prepared.

The process performed in these processing routines will be described below with reference to the first processing routine S2, for example.

At a step S3, a first operating image is manifested on the display and the data processing is executed in accordance with the data introduced by the operator through the keyboard 7. At a step S4, discrimination is made between the presence and the absence of a demand for an interruption effected by the depression of a help key on the keyboard 7. When the absence of the demand for an interruption is confirmed, a judgment is formed as to whether or not the first processing routine is completed at a step S5. When this judgment draws a negative answer, the data processing is returned to the step S3.

If the operator, prior to the execution of the first processing routine, comes upon an operational detail defying his comprehension or finds in the contents of the display on the operating image any point surpassing his comprehension, he depresses the help key on the keyboard. When the help key is depressed, the signal 13 for demanding an interruption (FIG. 2) is issued from the pulse generator 12 to the CPU 10.

When this occurrence of the demand for an interruption is discerned at the step S4, the data processing is immediately transferred to a step S6.

At the step S6, a first help image corresponding to the first operating image visibly manifested thence on the display 11 is manifested instead on the display 11.

The first help image which corresponds to the first operating image is not always limited to just one image. Depending on the size of the message, the first help image may separately embrace Part 2, Part 3, ... Part N in addition to itself as Part 1. Immediately after the depression of the help key, Part 1 of the first help image is manifested without fail on the display 11. By giving data for displaying subsequent parts of the help image to the data processing means through the keyboard 7, Part 2, Part 3 and etc. of the first display image can be sequentially manifested on the display 11.

When the operator understands the necessary operational procedure by the message on Part 1 of the first help image, the interruption is completed at a step S7, the message on the display 11 is shifted from Part 1 of the first help image, back to the first operating image and the operation is continued on the message freshly manifested on the display 11.

If Part 1 of the first help image does not have sufficient information for the operator's comprehension of the operational procedure, the operator proceeds to have Part 2, Part 3 and etc. manifested on the display and looks therethrough for necessary information. If the images of Part 2, Part 3 and etc. are devoid of enough information for the operator's comprehension of the operational procedure, the operator consults an operation manual or a person well versed in the operation of the system and secures the required information. At the step S7, the message manifested on the display is shifted from the help image back to the operating image.

When the first processing routine is completed at the step S5, the data processing is transferred to the second processing routine of the step S8 to repeat a similar data processing operation as described above.

When the third processing routine of the step S9 is completed, judgment is formed as to whether or not the data processing is to be completed at a step S15. If this judgment draws a negative answer, the data processing returns to the step S1. If the judgment draws an affirmative answer, the data processing as a series is brought to completion.

Then, when the ordinary processing routine escapes selection at the step S1, selection is made between executing and not executing the help image registering routine at a step S10. When the execution of the help image registering routine is selected, a message for feeding an image code at a step S11 is manifested on the display. When the image code is input through the keyboard in response to the message, the help image answering the introduced image code is manifested on the display at a step S12.

The term "image code" refers to a code corresponding one by one to the operating image involved in each of the individual processing routines such as the first processing routine and the second processing routine, for example. For each of the operating images, at least one help image is prepared as described above. The term "image code," therefore, may well be defined as what corresponds one by one to Part 1 of the help image prepared for the operating image corresponding to the image code. This code is expressed by a formulation designating the first operating image as "H001," the second operating image as "H002," and so on. When "H001" as an image code is input through the keyboard 7, for example, Part 1 of the first help image corresponding to the first operating image is manifested on the display 11.

When the message on the help image manifested on the display 11 is altered at a step S13, the resultant revised image is committed to be stored as a new help image corresponding to the image code "H001" in the RAM 9.

The new help image freshly stored in the RAM 9 is put to storage in the external memory means 6 through the medium of the interface 14.

Whenever the help image is called out thereafter in the first processing routine, therefore, the new help image which has undergone the alteration is manifested on the display.

In this case, the message on the help image may be registered as classified with color, depending on the importance and kind of the message. In other words, the color data designating the color of display of message data can also be registered.

When alteration of the message is completed on one given help image, discrimination is effected as to whether or not the registration of a help image is to be completed at a step S14. When the registration of a help image is to be continued then, the data processing mentioned above is returned to the step S11 to be continued therein. When the registration of the help image is completed, judgment is formed as to whether the processing with the data processing system is to be completed or continued at the step S15. When the continuation of the program is selected, the data processing is returned to the step S1.

As a concrete example, the operation of the embodiment of this invention as adapted for compilation of a handling manual of an electric product will be described below with reference to FIG. 3.

Here, the first processing routine is assumed to be a routine for the preparation of a cover sheet for the manual, the second processing routine is assumed to be a routine for the preparation of a text of the handling manual, and the third processing routine to be a routine for the preparation of a product specification.

When the program is started and the operator selects the ordinary processing routine at the step S1, a routine for the preparation of the cover sheet is executed at the step S2. On the display 11, a layout illustrating the cover sheet of the handling manual indicating such titles as "Handling Manual" and "XXX Co., Ltd." and "H001" representing the image code are manifested as the result. Then, the operator is enabled to complete the cover sheet by additionally printing such items as name and type of the product, for example, at stated positions on the display by suitable manipulation of the keyboard 7.

If the electric product happens to be an indoor air conditioner possessing only a space cooling function and the information given in the manuscript offers no definite source as a basis for forming a judgment as to whether the product should be designated as an "air conditioner" or a "cooler," the operator is enabled by the depression of the help key to call out the help image corresponding to the routine for the preparation of the cover sheet. When the help image contains a message starting that "the conditioner for indoor use should be designated as a "cooler" when it possesses only a space cooling function, and as an "air conditioner" when it has both space cooling and space warming functions," the operator forms a judgment that the product is a "cooler," for example, and then proceeds to the next routine.

If the help image is devoid of the message under discussion, the operator seeks necessary information from persons concerned or looks for pertinent materials to form the judgment that the electric product is a "cooler" and then proceeds to the next routine. As already pointed out above, the help image corresponding to the routine for the preparation of the cover sheet is not always limited to only one image but may embrace two or more images, depending on the size of the message. If the message covers a plurality of help images, the operator is enabled by the depression of a space key, for example, to scroll the images and form a decision as to whether or not they contain the necessary message.

If the absence of the necessary message is confirmed as the result, the operator supplements the help image with the message mentioned above so that when he encounters the same situation in the future, the new message of the help image will enable him readily to form a judgment that an air conditioner possessing only a space cooling function is a cooler. This practice of supplementation of the help image message warrants efficient preparation of the handling manual under discussion.

One concrete example of the addition to the message on the help image will be cited below.

First at the step S10, the operator selects the help image registry routine. Then at the step S11, he injects the image code. In the case described above, the operator injects through the keyboard 7 "H001" as the image code corresponding to the routine for the preparation of the cover sheet. At the step S12, the help image mentioned above which corresponds to the image code is called out on the display 11. At the step S13, the message starting that the conditioner for indoor use should be designated as a "cooler" when it possesses only the space cooling function, or as an "air conditioner" when it has both space cooling and space warming functions, is registered as an addition. Owing to this registration in the help image, this message is manifested without fail on the display whenever the help image is called, out in the future in the routine for the preparation of the cover sheet. If the message so added will be used frequently, it may be registered in a red color. If this message will be used infrequently, it may be registered in a white color. This practice warrants more efficient retrieval of the registered message.

The embodiment of the invention has been described as being adapted so that the help image the displayed contents of which are desired to be altered will be called out by the use of the image code. This arrangement is convenient because the calling out of the help image can be attained instantaneously. As a way of calling out the help image on the display, a method which utilizes a function of enabling the plurality of help images by continued depression of a shift key, for example, to be sequentially manifested on the display in a prescribed order such as the first help image, then the second help image, and so on until the particular help image desired to be given an alteration appears instead of effecting the injection of the method resorting to the image code described above.

The external memory means mentioned above is not limited to an external memory represented by a magnetic disc or magnetic tape. It may be a RAM which is incorporated in the relevant personal computer or office computer.

This invention meets its purpose sufficiently by being capable of effecting at least one of the functions of addition, correction, and deletion with respect to the help image data.

As is evident from the description given above, this invention attains the following effects.

Since the message on the help image can be readily given a desired addition, correction, or deletion, the latest message fitting the operator's convenience can be registered in the help image at any time. As the result, the data processing system can be operated efficiently without reference to the ability and experience on the part of the operator.

What is claimed is:

1. In a data processing system of the type comprising input means, display means, help image memory means for storing help image data, and data processing means for effecting data processing in response to data introduced through said input means, said system manifesting the outcome of said data processing on said display means and being operative to effect an interruption in said data processing and to cause the help image data stored in said help image memory means to be manifested on said display means, the improvement wherein said data processing system includes help image revising means for selectively altering the help image data stored in said help image memory means, and means for storing the altered help image data in said help image memory means.

2. The data processing system according to claim 1, wherein said help image data are message data to be displayed on said display means.

3. The data processing system according to claim 1, wherein said help image data comprise message data to be displayed on said display means and color data for designating the color of display of said message data.

4. The data processing system according to one of claims 1 to 3, wherein said help image revising means is rendered operative in response to input of an image code from said input means.

5. The data processing system of claim 1 wherein said input means includes a keyboard, and means coupling said keyboard to said help image revising means to permit an operator of said system to alter the help image data stored in said help image memory means by use of said keyboard.

* * * * *